(12) United States Patent
Morley

(10) Patent No.: US 10,175,341 B2
(45) Date of Patent: Jan. 8, 2019

(54) SYSTEM AND APPARATUS FOR SEARCH RADAR PROCESSING USING RANDOM MATRIX THEORY

(71) Applicant: Peter Dan Morley, Front Royal, VA (US)

(72) Inventor: Peter Dan Morley, Front Royal, VA (US)

(*) Notice: Subject to any disclaimer, the term of this patent is extended or adjusted under 35 U.S.C. 154(b) by 239 days.

(21) Appl. No.: 15/393,868

(22) Filed: Dec. 29, 2016

(65) Prior Publication Data

US 2017/0108581 A1 Apr. 20, 2017

Related U.S. Application Data

(63) Continuation of application No. 14/121,980, filed on Nov. 10, 2014, now Pat. No. 9,568,591.

(51) Int. Cl.
*G01S 7/292* (2006.01)
*G01S 7/41* (2006.01)
*G01S 13/08* (2006.01)
*G01S 13/00* (2006.01)

(52) U.S. Cl.
CPC ............ *G01S 7/2927* (2013.01); *G01S 7/414* (2013.01); *G01S 13/08* (2013.01)

(58) Field of Classification Search
CPC ......... G01S 7/2927; G01S 7/414; G01S 13/08
See application file for complete search history.

(56) References Cited

U.S. PATENT DOCUMENTS

| 5,333,191 A | 7/1994 | McCarthy | |
|---|---|---|---|
| 5,376,940 A | 12/1994 | Abatzoglou | |
| 7,079,072 B1 | 7/2006 | Abatzoglou | |
| 7,260,488 B2 * | 8/2007 | Abe | G06K 9/00711 382/219 |
| 7,474,252 B2 * | 1/2009 | Natsume et al. | G01S 3/74 342/70 |

(Continued)

OTHER PUBLICATIONS

M. Z. Shakir et al., "Eigenvalue Ratio Detection Based on Exact Moments of Smallest and Largest Eigenvalues"; Proceedings of the 2011 6th International ICST Conference on Cognitive Radio Oriented Wireless Networks and Communications (CROWNCOM); pp. 46-50; DOI 10.4108/icst.crowncom.2011.246151. (Year: 2011).*

(Continued)

*Primary Examiner* — Bernarr E Gregory
(74) *Attorney, Agent, or Firm* — Maier & Maier, PLLC

(57) ABSTRACT

A system and apparatus configured to process search radar data based on random matrix theory. During the time that the radar receiver is listening for return target echoes, the raw data stream may be fed to an analog to digital converter to create a sample voltage file. This sample voltage file may be processed by a digital signal processor that computes the eigenvalues of a sample covariance matrix generated for each pulse duration interval. The ratio of the largest to smallest eigenvalue is determined and compared to the system noise eigenvalue ratio. The sensitivity for detecting targets over the present state of the art is expected to be an approximate enhancement factor of one thousand, due to the detection of coherent energy instead of a transmitted waveform. The increase of detection distance for same radar cross section is expected to be an approximate 5.6 enhancement factor.

15 Claims, 8 Drawing Sheets

Method for Search Radar Processing Using Random Matrix Theory Peter D. Morley

(56) References Cited

U.S. PATENT DOCUMENTS

| | | | |
|---|---|---|---|
| 8,816,900 B2* | 8/2014 | Hasegawa | G01S 3/74 342/174 |
| 9,568,591 B2* | 2/2017 | Morley | G01S 7/414 |
| 2009/0073026 A1* | 3/2009 | Nakagawa | G01S 3/74 342/107 |
| 2009/0247093 A1* | 10/2009 | Saito | H04B 7/0689 455/73 |
| 2010/0015935 A1* | 1/2010 | Zeng | H04B 17/345 455/206 |
| 2010/0019954 A1* | 1/2010 | Mizutani | G01S 3/74 342/147 |
| 2011/0286555 A1* | 11/2011 | Cho | H04L 25/021 375/343 |

OTHER PUBLICATIONS

M. Z. Shakir et al., "On the Decision Threshold of Eigenvalue Ratio Detector Based on Moments of Joint and Marginal Distributions of Extreme Eigenvalues"; IEEE Transactions on Wireless Communications; vol. 12, No. 3; Mar. 2013; pp. 974-983; published by IEEE, Piscataway, NJ, USA.. (Year: 2013).*

Y. Kwon et al., "A Thresholding Scheme for Target Detection for Noise Radar Systems Based on Random Matrix Theory"; Proceedings of the 2014 IEEE Radar Conference (May 19-23, 2014); pp. 0692-0695. (Year: 2014).*

* cited by examiner

Method for Search Radar Processing Using Random Matrix Theory Peter D. Morley

Method for Search Radar Processing Using Random Matrix Theory
Peter D. Morley $$V = \begin{bmatrix} \vec{V_1} \\ \vec{V_2} \\ \vec{V_3} \\ ********* \end{bmatrix}$$

Method for Search Radar Processing Using Random Matrix Theory
Peter D. Morley

FIG.5

SYSTEM AND APPARATUS FOR SEARCH RADAR PROCESSING USING RANDOM MATRIX THEORY

CROSS-REFERENCE TO RELATED APPLICATIONS

This application is a continuation of U.S. patent application Ser. No. 14/121,980, filed on Nov. 10, 2014, entitled "METHOD FOR SEARCH RADAR PROCESSING USING RANDOM MATRIX THEORY," the entire contents of which are hereby incorporated by reference, now U.S. Pat. No. 9,568,591.

REFERENCES CITED

U.S. Patent Documents: U.S. Pat. No. 4,005,415 A 3/1975 Kossiakoff

Other Publications: P. D. Morley and Jerry W. Brown; 'Detecting Coherent Energy'; January 2012; International Journal of Modern Physics C; vol. 23, No. 1; 1250006. www.radartutorial.eu/19.kartei/karte911.en.html.

FIELD OF THE INVENTION

This invention relates to a new processing method for determining the detection and distance of a target from receipt of reflected energy.

BACKGROUND

Search radars transmit energy packets and receive energy echos from targets. In order to discover a target, the signal to noise power ratio (SNR), where signal power here is the returned radar echo power, and noise power is the system power for no target, must be equal to or greater than a threshold (Kossiakoff U.S. Pat. No. 4,005,415). In operational uses, this threshold is 10. As an example of search radars, in FIG. 1, a nominal SNR curve as a function of target distance is given for the Russian P37 'Bar Lock' search radar (www.radartutorial.eu), for a 10 m² target. Such a target is a typical third generation fighter radar cross section for centimetric radiation. From FIG. 1, the 'Bar Lock' has a nominal detection range of approximately 220 km (SNR≅10) for this particular target. We wish to increase the detection range to approximately 1200 km for this same target radar cross section, by doing a new method of radar processing. The reader should appreciate that a detection of any target at 1200 km, yet alone a target of 10 m² cross section, is so far outside our example of a conventional P37 search radar envelope that the original Russian radar design engineers would consider it fantasyland.

SUMMARY OF THE INVENTION

The invention relies on the modern physics concept of coherent energy (P. D. Morley and Jerry W. Brown). While the words coherent energy to an engineer would mean phase array antenna or laser light (i.e. correlated light waves having nearly the same frequency and phase), the physics meaning is much deeper. Coherent energy means that when energy is converted into voltages by means of a transducer, and then digitally sampled, the voltage measured at time=now is causally related to all past voltage measurements; we say coherent energy has an infinite time correlation. The radar pulse from an antenna is coherent energy in this physical sense. This invention detects the reflected coherent energy transmitted by a radar antenna, and not the identified reflected waveform itself.

During the time that a receiving antenna is listening for the return radar echoes, the raw radar data is fed into an analogue-to-digital converter (ADC), FIG. 2, to obtain a stream of voltage samples. If the ADC sample rate is S samples per second, the voltage stream has samples every 1/S units of time. In FIG. 3, we show a representative example. This sample data stream in the listening phase is then divided into time-slices, each equal to the pulse duration of the transmitted pulse. Using our example of the Russian P37 search radar, its transmitted pulse duration may be one micro-second. Since we are interested in this example of detecting a target 1200 km away, the total listening time is 8 milli-seconds, so there are 8000 one micro-second time-slices. Each of these time-slices are processed by the digital signal processor (DSP), FIG. 2, in a very specific manner.

The number of voltage samples in each time-slice is $N_S$. The DSP sub-divides the $N_S$ data into a number of data-segments, FIG. 4, $\vec{V}_1, \vec{V}_2, \ldots$, each having the same number of sample points. If there are $N_D$ data-segments, each has $N_S/N_D=N$ number of sample data points. We form a column matrix $\vec{V}$ of these $N_D$ data-segments as illustrated in FIG. 5. We then construct the sample covariance matrix R as $$R = \frac{1}{N} \vec{V} \times \vec{V}' \qquad (1)$$

where $\vec{V}'$ is the transpose matrix. This is done for every time-slice. R is a $N_D \times N_D$ symmetric matrix and its eigenvalue ratios are determined by random matrix theory (P. D. Morley and Jerry W. Brown). If the time-slice has just noise, the ratio of the largest eigenvalue to smallest eigenvalue (call the ratio $\zeta_R$) is $$\zeta_R = \frac{(1+\sqrt{\alpha})^2}{(1-\sqrt{\alpha})^2} \qquad (2)$$

If the time-slice has coherent energy within it, the formula becomes $$\zeta_R = \frac{(1+\rho)\left(1+\frac{\alpha}{\rho}\right)}{(1-\sqrt{\alpha})^2} \qquad (3)$$

In both formulae, the quantity $\alpha$ is $$\alpha = N_D/N \qquad (4)$$

For the case of coherent energy present, the quantity $\rho$ is $$\rho = N_D \times \text{SNR} \qquad (5)$$

where SNR is the signal-to-noise ratio discussed earlier. The DSP determines $\zeta_R$ for each time-slice and compares it to a threshold, FIG. 6. If the max-to-min eigenvalue ratio $\zeta_R$ is greater than the threshold, the time-slice has the reflected target energy in it and the range is determined by the positional value (time-stamp) of the time-slice in the listening data stream. If the transmitter and receiver were the same antenna, the distance is just $(T_{received}-T_{emitted}) \times c/2$ where c is the speed of light, $T_{received}$ is the receive time of the time-slice having coherent energy, and $T_{emitted}$ is the original time of the emitted pulse.

In order to address the possibility that a reflected echo falls between two time-slices, the total eigenvalue pass by a DSP is done twice where the time-slices differ by half the time of the pulse duration. If the pulse duration were one micro-second, for example, the time-slices of the two passes differ in their start times by one-half micro-second. One pass or both passes may find coherent energy in neighboring time-slices.

DESCRIPTION OF THE DRAWINGS

FIG. 5 shows how the column matrix is formed;

DESCRIPTION OF THE PREFERRED EMBODIMENTS

In order for the asymptotic random matrix theory formulae be accurate, each time slice must have a large number of voltage samples. Operationally, each micro-second time-slice should have at least 160000 samples in it. That means the ADC sample rate should be at least $160 \times 10^9$ samples per second. The threshold value for the decision tree is set by the noise max-to-min eigenvalue ratio, and its standard deviation. By taking many time-slices of noise, the noise-mean ($\mu_{noise}$) and noise-standard-deviation ($\sigma_{noise}$) of the noise eigenvalues are determined so the threshold should be $$\zeta_R > \mu_{noise} + \sigma_{noise} \quad (6)$$

There is a small sensitivity on the choice of the number $N_D$ of data segments each time-slice is divided into, from the corrections to the asymptotic random matrix theory. In general, the number $N_D$ of data segments should have about 10000 samples in them (or higher).

Figure 1:
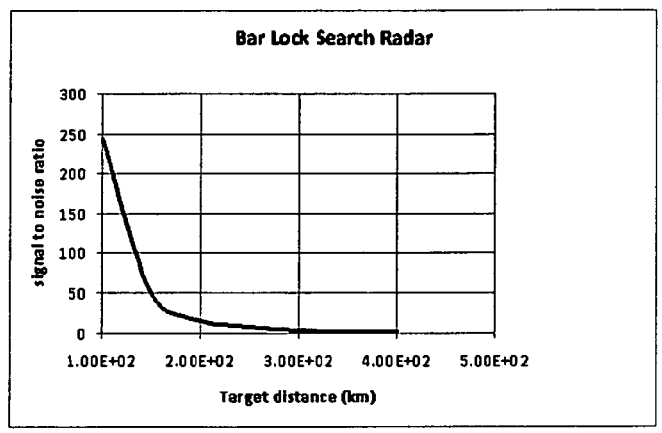
FIG. 1 gives a signal-to-noise power ratio for a search radar using the Russian P37 radar with a 10 m$^2$ target as the example.
Figure 2:
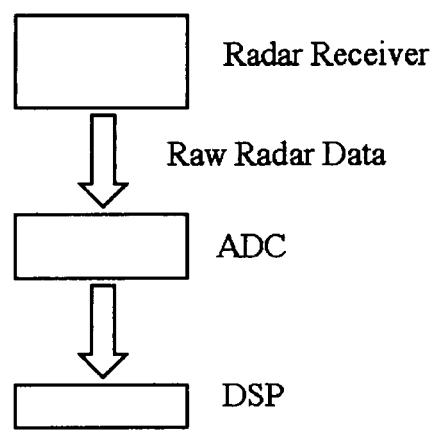
FIG. 2 gives the components used to extract raw voltage data samples during the listening phase of the radar.
Figure 3:
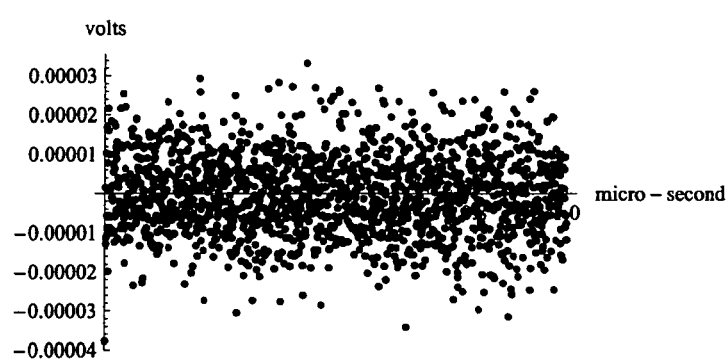
FIG. 3 gives an example of the digitized raw data for one micro-second time-slice having only noise in it, for the P37 radar example.
Figure 4:
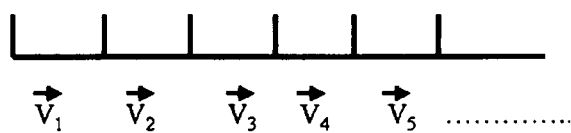
FIG. 4 shows how the digital signal processor (DSP) divides each time-slice into $N_D$ number of pieces.
Figure 6:
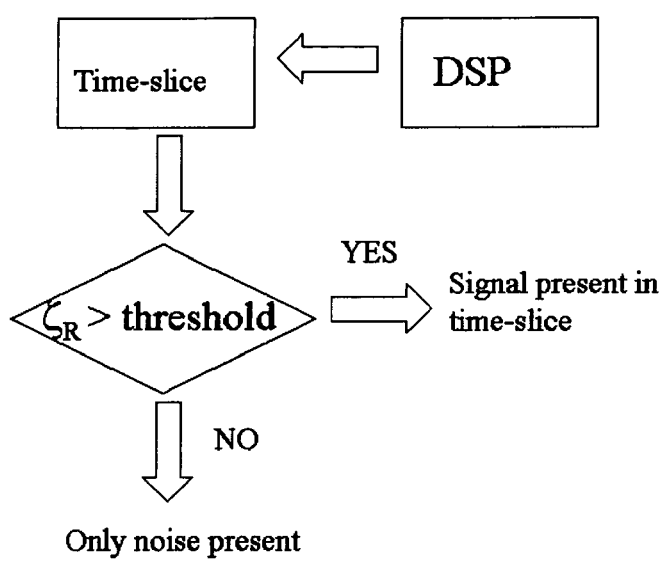
FIG. 6 shows how the time-slice having coherent energy within it is identified.
Figure 7:
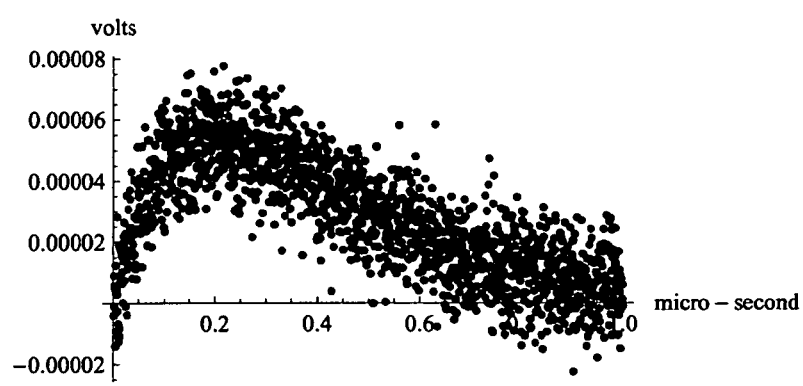
FIG. 7 shows the one micro-second time-slice of digitized raw data associated with the distance of 220 km with coherent energy residing in it, for the P37 radar example.
Figure 8:
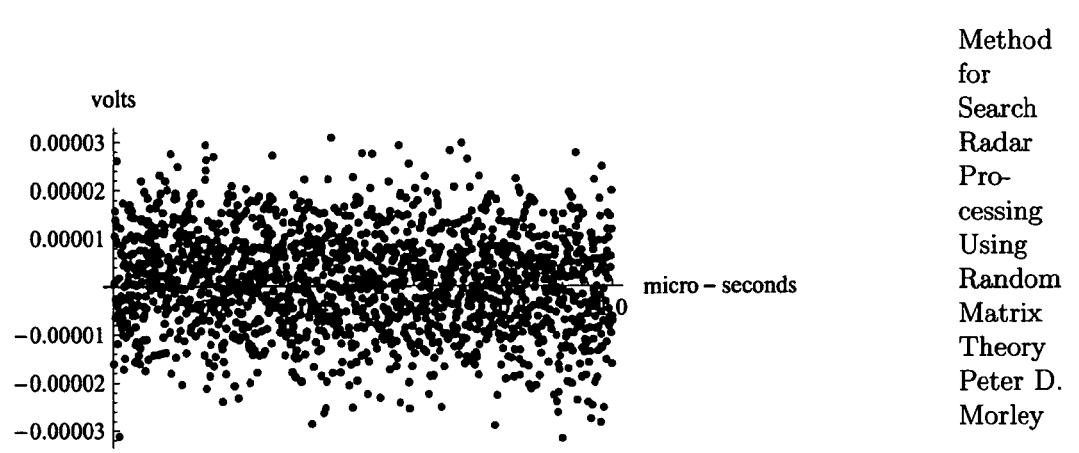
FIG. 8 shows the one micro-second time-slice of digitized raw data associated with the distance of 1200 km with coherent energy residing in it, for the P37 radar example. Compare to noise only in FIG. 3.

We finish the P37 Russian search radar example. The ADC rate is chosen to be $160 \times 10^9$ samples per second. In FIG. 7 we present the raw data voltage samples associated with the time-slice with target located 220 km away, while in FIG. 8, we present the raw data voltage samples associated with the time-slice with target located 1200 km away, both 10 m$^2$ radar cross sections. For the simulation, we chose $N_D=16$ giving us a $16 \times 16$ sample covariance matrix, with each of the 16 $\vec{V}$ having 10000 samples in them. In the first two Tables, we see that this low radar cross section target is discernable out to 1200 km, because the measured $\zeta_R$ is significantly larger than the mean-noise+noise-standard-deviation. Again, the practical implementation requires two passes, separated by start times one-half$\times$pulse duration. In the tables below, we give the SNR ground truth and the predicted SNR using Eq (5) in Eq (3) with the measured value of $\zeta_R$ on the left-hand-side. The mean noise plus its standard deviation for this example is 1.165, which means the measured $\zeta_R$ at 1200 km is about 12% larger and discernable. Thus the statement in the abstract that the expected enhancement is around a factor of 1000 is due to the comparison of SNR=10 to SNR=0.01. Since the SNR decreases as $$\frac{1}{R^4},$$

the stand-off distance enhancement for same radar cross section is around $$\sqrt[4]{1000} \simeq 5.6.$$

TABLE 1

P37 Russian search radar example
10 m$^2$ radar cross section

| distance (km) | noise power (W) | signal power (W) | SNR ground truth |
|---|---|---|---|
| 220 | 0.205124e−11 | 0.214881e−10 | 0.104757e+02 |
| 1200 | 0.205124e−11 | 0.242745e−13 | 0.118158e−01 |

TABLE 2

P37 Russian search radar example
10 m$^2$ radar cross section

| $\zeta_R$ | Predicted SNR | $\mu_{noise}$ | $\sigma_{noise}$ |
|---|---|---|---|
| 0.179560e+03 | 0.102801e+02 | .1152369e+01 | .1273190e−01 |
| 0.130375e+01 | 0.119743e−01 | .1152369e+01 | .1273190e−01 |

While the use of a constant threshold depending on the mean noise value of $\zeta_R$, $\mu$, and its standard deviation $\sigma$ is robust, because each is computed over thousands of time-slices with each time-slice having a minimum number of 160000 sample points, a more nuanced threshold may be used depending on the expected radar cross section. In the following Table, $\zeta_R$ is computed for a 10 m$^2$ target as a function of distance. Thus the threshold value may be set by the expected value of the target at, say 800 km, which in this example would be a threshold value of 2.

TABLE 3

P37 Russian search radar example
10 m$^2$ radar cross section

| distance (km) | $\zeta_R$ |
|---|---|
| 200 | 258.4 |
| 220 | 179.56 |
| 300 | 52.77 |
| 400 | 17.47 |
| 500 | 7.80 |
| 600 | 4.32 |

TABLE 3-continued

P37 Russian search radar example
10 m² radar cross section

| distance (km) | $\zeta_R$ |
|---|---|
| 700 | 2.82 |
| 800 | 2.11 |
| 900 | 1.683 |
| 1000 | 1.511 |
| 1100 | 1.3465 |
| 1200 | 1.30 |

What is claimed is:

1. A radar receiver apparatus, comprising:
a radar receiver antenna; and
an analog-to-digital converter, the analog-to-digital converter operationally coupled to the radar receiver antenna and configured to receive an analog radar signal from the radar receiver antenna, the analog-to-digital converter further configured to output a digital signal converted from the analog radar signal, the digital signal comprising a plurality of time-stamped time-slices;
the radar receiving apparatus further comprising a processor configured to perform the steps of:
computing the ratio $\zeta_R$ of the largest to smallest eigenvalue of a constructed sample covariance matrix associated with the plurality of time-stamped time-slices;
comparing the ratio $\zeta_R$ of each time-slice to a noise threshold value or a computed nuanced threshold value; and
identifying the presence of a signal by having $\zeta_R$ greater than the threshold.

2. The radar receiver apparatus of claim 1, further comprising a digital signal processor, the digital signal processor configured to receive the digital signal from the analog-to-digital converter, the digital signal processor configured to subdivide each of the plurality of time-stamped time-slices into a plurality of data segments each having a plurality of data points.

3. The radar receiver apparatus of claim 2, wherein the constructed sample covariance matrix is formed by:
dividing the plurality of time-stamped time-slices into a plurality of data segments, each time-stamped time slice being of length $N_s$, each data segment being denoted by $\vec{V}_{ND}$ and having a number of data points N;
forming a column matrix $\vec{V}$ from each of the data segments $\vec{V}_{ND}$; and
constructing the sample covariance matrix R as $$R = \frac{1}{N} \vec{V} \times \vec{V}',$$

wherein $\vec{V}'$ is a transpose matrix of $\vec{V}$.

4. The radar receiver apparatus of claim 2, wherein the ratio $\zeta_R$ of each time-slice is compared to a noise threshold value, wherein the noise threshold value is a noise max-to-min eigenvalue ratio $\zeta_{R,NOISE}$, and wherein the noise max-to-min eigenvalue ratio $\zeta_{R,NOISE}$ is calculated by:

$$\zeta_{R,NOISE} = \frac{(1+\sqrt{\alpha})^2}{(1-\sqrt{\alpha})^2}$$

wherein $\alpha = N_D/N$, $N_D$ is a number of data segments in the plurality of data segments, and N is a number of data points in the plurality of data points.

5. The radar receiver apparatus of claim 2, wherein the ratio $\zeta_R$ of the largest to smallest eigenvalue for a time-slice in the plurality of time-stamped time-slices is calculated by:

$$\zeta_R = \frac{(1+\rho)\left(1+\frac{\alpha}{\rho}\right)}{(1-\sqrt{\alpha})^2}$$

wherein $\alpha = N_D/N$, $N_D$ is a number of data segments in the plurality of data segments, N is a number of data points in the plurality of data points, $\rho = N_D \times SNR$, and SNR is a signal-to-noise ratio.

6. The radar receiver apparatus of claim 1, wherein the analog-to-digital converter is further configured to output a second-pass digital signal converted from the analog radar signal, the second-pass digital signal comprising a plurality of second-pass time-stamped time-slices; and
wherein the start time of the first time-stamped time slice in the plurality of time-stamped time slices in the digital signal and the start time of the first time-stamped time slice in the plurality of second-pass time-stamped time slices in the second-pass digital signal differs by half the length of a time slice.

7. The radar receiver apparatus of claim 1, wherein each time slice in the plurality of time slices is equal in length to a pulse duration of a transmitted pulse of the analog radar signal.

8. A radar system, comprising:
a radar transmitter antenna;
a radar receiver antenna; and
an analog-to-digital converter, the analog-to-digital converter operationally coupled to the radar receiver antenna and configured to receive an analog radar signal from the radar receiver antenna, the analog-to-digital converter further configured to output a digital signal converted from the analog radar signal, the digital signal comprising a plurality of time-stamped time-slices;
the radar system further comprising a processor configured to perform the steps of:
computing the ratio $\zeta_R$ of the largest to smallest eigenvalue of a constructed sample covariance matrix associated with the plurality of time-stamped time-slices;
comparing the ratio $\zeta_R$ of each time-slice to a noise threshold value or a computed nuanced threshold value; and
identifying the presence of a signal by having $\zeta_R$ greater than the threshold.

9. The radar system of claim 8, further comprising a digital signal processor, the digital signal processor configured to receive the digital signal from the analog-to-digital converter, the digital signal processor configured to subdivide each of the plurality of time-stamped time-slices into a plurality of data segments each having a plurality of data points.

10. The radar system of claim 9, wherein the constructed sample covariance matrix is formed by:
dividing the plurality of time-stamped time-slices into a plurality of data segments, each time-stamped time slice being of length $N_s$, each data segment being denoted by $\vec{V}_{ND}$ and having a number of data points N;
forming a column matrix $\vec{V}$ from each of the data segments $\vec{V}_{ND}$; and
constructing the sample covariance matrix R as $$R = \frac{1}{N} \vec{V} \times \vec{V}',$$

wherein $\vec{V}'$ is a transpose matrix of $\vec{V}$.

11. The radar system of claim 9, wherein the ratio $\zeta_R$ of each time-slice is compared to a noise threshold value, wherein the noise threshold value is a noise max-to-min eigenvalue ratio $\zeta_{R,NOISE}$, and wherein the noise max-to-min eigenvalue ratio $\zeta_{R,NOISE}$ is calculated by:

$$\zeta_{R,NOISE} = \frac{(1+\sqrt{\alpha})^2}{(1-\sqrt{\alpha})^2}$$

wherein $\alpha = N_D/N$, $N_D$ is a number of data segments in the plurality of data segments, and N is a number of data points in the plurality of data points.

12. The radar system of claim 9, wherein the ratio $\zeta_R$ of the largest to smallest eigenvalue for a time-slice in the plurality of time-stamped time-slices is calculated by:

$$\zeta_R = \frac{(1+\rho)\left(1+\frac{\alpha}{\rho}\right)}{(1-\sqrt{\alpha})^2}$$

wherein $\alpha = N_D/N$, $N_D$ is a number of data segments in the plurality of data segments, N is a number of data points in the plurality of data points, $\rho = N_D \times SNR$, and SNR is a signal-to-noise ratio.

13. The radar system of claim 8, wherein the analog-to-digital converter is further configured to output a second-pass digital signal converted from the analog radar signal, the second-pass digital signal comprising a plurality of second-pass time-stamped time-slices; and
wherein the start time of the first time-stamped time slice in the plurality of time-stamped time slices in the digital signal and the start time of the first time-stamped time slice in the plurality of second-pass time-stamped time slices in the second-pass digital signal differs by half the length of a time slice.

14. The radar system of claim 8, wherein each time slice in the plurality of time slices is equal in length to a pulse duration of a transmitted pulse of the analog radar signal.

15. The radar system of claim 8, wherein the radar transmitter antenna and radar receiver antenna are the same antenna; and
wherein the distance to a radar echo is determined by $(T_{RECEIVED} - T_{EMITTED}) \times c/2$, where c is the speed of light, $T_{RECEIVED}$ is a receive time of a time-slice having coherent energy, and $T_{EMITTED}$ is an original time of a pulse emitted by the radar transmitter antenna.

* * * * *